UNITED STATES PATENT OFFICE.

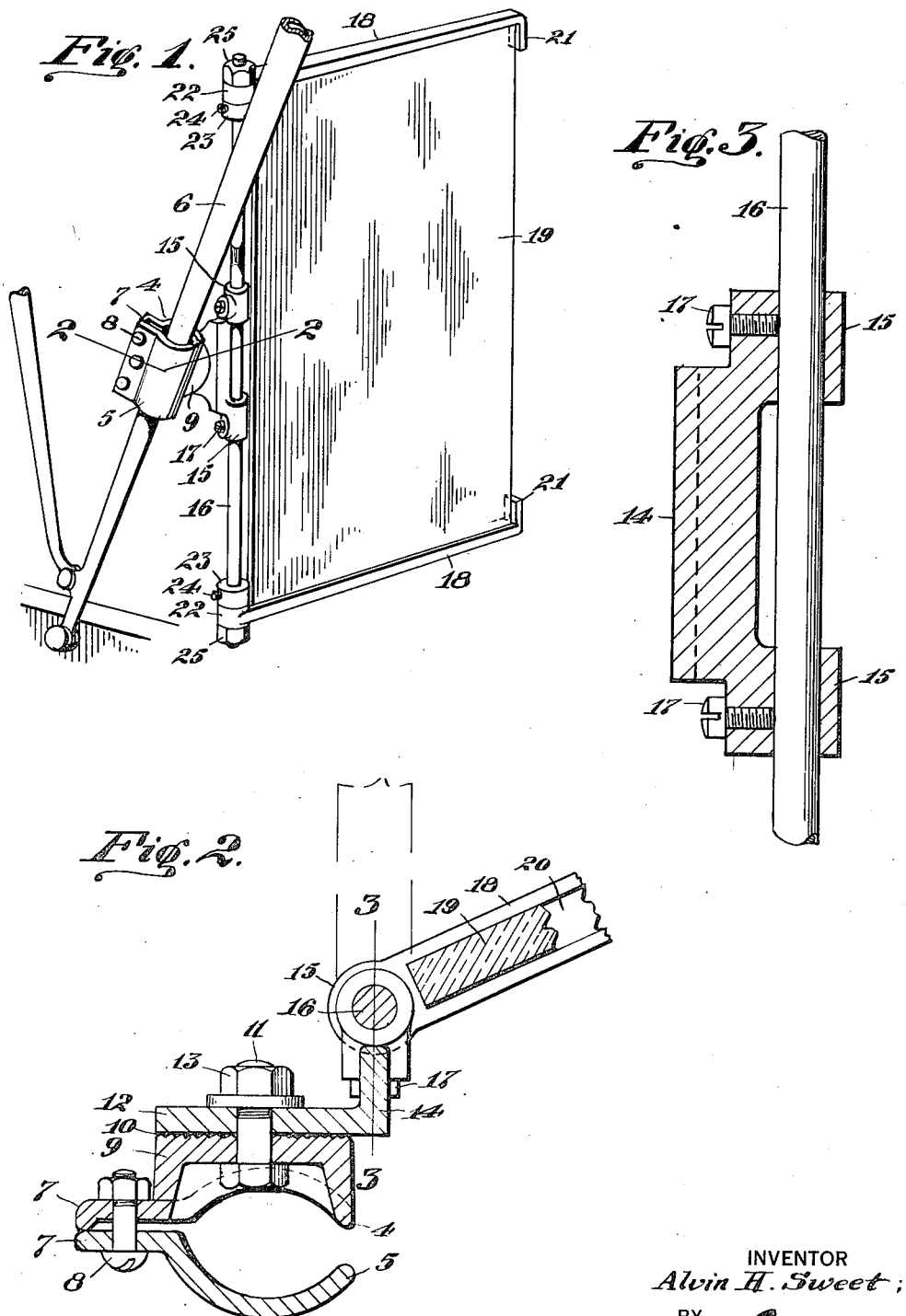

ALVIN H. SWEET, OF LOS ANGELES, CALIFORNIA.

WINDSHIELD ATTACHMENT FOR AUTOVEHICLES.

1,353,552.  Specification of Letters Patent.  Patented Sept. 21, 1920.

Application filed September 18, 1919. Serial No. 324,377.

*To all whom it may concern:*

Be it known that I, ALVIN H. SWEET, a citizen of the United States, residing at Los Angeles, in the county of Los Angeles and State of California, have invented new and useful Improvements in Windshield Attachments for Autovehicles, of which the following is a specification.

My invention relates to a wind shield attachment for auto vehicles and my particular object is to provide an adjustable wind shield which is adapted to be attached to the side members of the bow of a vehicle top, and a further object is to provide a wind shield of this character which can be adjusted vertically, swung horizontally into various positions, and disposed vertically or at an angle to the vertical, as desired irrespective of any inclination of the bow side member.

Another object is to provide a substantial support for a wind shield plate, embodying constructions for affording the adjustments above named, so formed and arranged that the shield can be readily displaced.

Other objects will appear hereinafter.

The invention is illustrated by the accompanying drawings in which:

Figure 1 is a perspective view illustrating the application of the invention to the bow of a vehicle top.

Fig. 2 is a detail horizontal section as seen on the line 2—2 of Fig. 1, illustrating the manner of constructing the several adjustable elements.

Fig. 3 is a view in vertical section as seen on the line 3—3 of Fig. 2, illustrating the construction for vertical adjustment of the wind shield.

In carrying out my invention I employ a pair of clamp members 4 and 5 having arcuate jaws adapted to engage the opposite sides of the side member 6 of the bow of a vehicle top; the clamp members being formed with flanges 7 adapted to be connected by bolts or screws 8 or other suitable fastenings, by which these members may be securely clamped on the bow. The clamping member 4 is formed with a hollow boss 9 preferably circular in outline and having a serrated or milled outer face 10. Extending outwardly from the boss and centrally thereof is a threaded stud 11 of any suitable description on which a disk or plate 12 is turnably mounted; a nut 13 being screwed on the stud 11 and adapted to clamp the disk against the serrated face to securely hold the disk against turning movement on the stud when so desired.

The disk 12 has a bracket 14 formed on one edge thereof and extending outwardly at right angles thereto and which bracket is formed with a pair of alined sleeves 15 through which a rod 16 slidably extends and is mounted for longitudinal and turnable adjustment. Set-screws 17 are threaded in the sleeves 15 and are adapted to engage the rod 16 to hold the latter against movement relative to the sleeves. Mounted on each end of the rod 16 is a turnable bracket 18 extending at right angles to the rod 16 and forming supports for a wind shield plate 19 formed of glass or any other suitable material; the brackets 18 being formed with channels 20 to receive the upper and lower edges of the plate 19 and having turned projections 21 on their ends arranged to engage the outer vertical edge of the plate to hold the latter against movement lengthwise of the brackets.

The channels 20 may be lined with any suitable cushioning material on which the plate seats. Means are provided for adjusting the position of the brackets 18 on the rod 16 whereby the brackets may be readily positioned to accommodate plates of various lengths. This means is here shown as consisting of sleeves 22 formed on the inner ends of the brackets 18 and slidably encircling the rod 16, collars 23 mounted for adjustment on the rod 16. against which the sleeves 22 bear and which are securely held in place by set-screws 24, and nuts 25 threaded on the outer ends of the rod 16 for clamping the sleeves tightly against the collars to hold the brackets against movement relative to the rod.

In the application of the invention, the clamping members are secured to the bow and the disk is turned to dispose the rod vertically or in any other desired position relative to the bow, whereupon the shield is adjusted vertically by shifting the rod 16 in the sleeves 15 to dispose the shield on the desired horizontal plane; the rod being turned in the sleeves to dispose the shield at any desired angle. On tightening the set-screws 17 the rod and the wind shield will be held stationary. If desired the pivotal connection of the sleeves 22 may be sufficiently loose to permit turning of the wind shield to any desired position, yet sufficiently tight to prevent ready displacement of the shield. By providing the bracket with spaced sleeves and engaging the rod therein, the latter will be substantially supported.

While I have specifically described the detail construction of my invention, it is obvious that various changes may be made in such details without departing from the spirit and scope of the invention as set forth in the appended claims.

I claim:

1. The combination of the bow of the vehicle top, a pair of clamping members engageable with said bow, a boss formed on one of said members, a bracket pivoted for rotary movement on said boss, means for clamping said bracket against movement on said boss, a pair of alined spaced sleeves on said bracket, a rod extending through said sleeves, means for engaging said rod for holding it in various adjusted positions relative to said sleeves, said rod extending in a direction at right angles to the pivotal mounting of said bracket, and a windshield plate carried by said rod.

2. The combination of the bow of a vehicle top, a clamping member formed of brackets engageable with said bow, a serrated boss formed on one of said brackets, a disk pivoted on said boss, means for clamping said disk against movement on said boss, a bracket formed on said disk, a pair of alined spaced sleeves on said bracket, a rod extending through said sleeves, means for engaging said rod for holding it in various adjusted positions relative to the said sleeves, a wind shield plate and means on said rod for engaging the upper and lower edges of said plate.

ALVIN H. SWEET.